United States Patent [19]
Kamata et al.

[11] Patent Number: 4,817,923
[45] Date of Patent: Apr. 4, 1989

[54] VIBRATION DAMPER

[75] Inventors: Yoshikiyo Kamata, Hachioji; Takashi Fukuoka, Fuchu, both of Japan

[73] Assignee: Kioritz Corporation, Tokyo, Japan

[21] Appl. No.: 78,015

[22] Filed: Jul. 20, 1987

Related U.S. Application Data

[63] Continuation of Ser. No. 894,806, Aug. 8, 1986, abandoned, which is a continuation of Ser. No. 710,680, Mar. 12, 1985.

[30] Foreign Application Priority Data

Mar. 21, 1984 [JP] Japan .................................. 59-40328

[51] Int. Cl.$^4$ .............................................. F16F 1/52
[52] U.S. Cl. ..................................... 267/63 A; 267/153
[58] Field of Search ............ 267/63 R, 63 A, 57.1 R, 267/57.1 A, 140.1, 140, 141, 140.2, 140.3, 140.4, 140.5, 141.1, 141.2, 141.3, 141.4, 141.5, 141.6, 141.7, 153, 163

[56] References Cited

U.S. PATENT DOCUMENTS

| | | | |
|---|---|---|---|
| 1,957,694 | 5/1934 | Chamberlain et al. | 267/141 |
| 2,231,769 | 2/1941 | Merrill | 267/63 A |
| 2,294,674 | 9/1942 | Lord | 267/141.6 |
| 3,402,924 | 9/1968 | Rix | 267/153 |
| 3,409,284 | 11/1968 | Rix | 267/153 |

FOREIGN PATENT DOCUMENTS

| | | |
|---|---|---|
| 2719925 | 11/1977 | Fed. Rep. of Germany . |
| 2911498 | 10/1980 | Fed. Rep. of Germany . |
| 2460423 | 11/1977 | France . |
| 1147909 | 10/1980 | United Kingdom . |

Primary Examiner—John W. Caldwell, Sr.
Assistant Examiner—Alvin Oberley
Attorney, Agent, or Firm—Browdy and Neimark

[57] ABSTRACT

A vibration damper comprising; a main body which is formed from an elastic material into a substantially cubic overall form; and fixtures which are attached to each of two surfaces of the main body which are adjacent each other.

1 Claim, 1 Drawing Sheet

VIBRATION DAMPER

BACKGROUND OF THE INVENTION

This application is a continuation of application Ser. No. 894,806, filed Aug. 8, 1986, abandoned, which is a continuation of application Ser. No. 710,680, filed Mar. 12, 1985.

This invention relates to a vibration damper used for a portable power tool such as a chain saw.

Conventionally, in order to minimize the vibration transferred to a worker from the power source such as an internal combustion engine or from the working portion in this kind of tool, measures have been taken to absorb this vibration by fixing one end of a rubber vibration damper of a cylindrical, stepped cylindrical or hourglass shape onto a frame body and fixing and supporting the power source by the other end of the damper. Such a conventional vibration damper is disadvantageous in that the insulating effect is low with respect to vibration in the direction of the axis of the attached damper and in that the entire length of the damper including these fixtures becomes large.

SUMMARY OF THE INVENTION

Accordingly it is an object of the invention to eliminate the above-described drawbacks of the conventional vibration damper and to provide a vibration damper in which the damping effect is heightened by attaching fittings in different directions from each other so that vibrations occuring in all directions can be effectively absorbed by the damper which is deformed by shearing forces.

To this end, a vibration damper according to this invention is formed of an elastic material and is characterized in that fixtures are attached to two adjacent first and second surfaces of a main body having a substantially cubic form as a whole.

In other words, in this invention two adjacent surfaces of the vibration damper body which cross each other are designed to be the surfaces to which the fittings are attached. This structure makes it possible to absorb vibration from any direction mainly on the bais of the damper being deformed by shearing forces. In addition, since the main body is of a substantially cubic form as a whole, its wearing ability as a supporting member is high. Therefore, the present invention provides a vibration damper with high damping effect and a structure simple enough to be easily manufactured.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
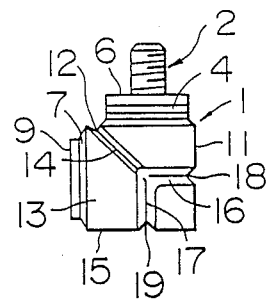
FIG. 1 is a side elevational view of an embodiment of a vibration damper according to the invention.
Figure 2:
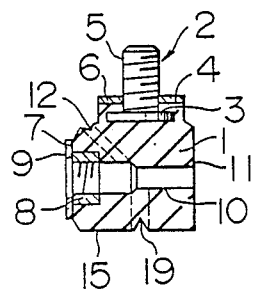
FIG. 2 is a vertical sectional view of the vibration damper shown in FIG. 1.

Referring first to FIG. 1, a damper body 1 of a vibration damper made of an elastic material such as rubber is formed into a substantially cubic overall form. To the damper body 1 a bolt 2 is attached as a fixture with the head portion 3 thereof being securely embedded in one surface 4 of the damper body 1 and the threaded portion 5 thereof projecting outwardly from the central portion. A reinforcing sheet 6 is attached by heat bonding to the surface 4.

In the approximately central portion of another surface 7 of the damper body 1 a nut 8 is securely embedded another fixture, with a threaded bore being opened outwardly. Further, a reinforcing sheet 9 is attached by heat bonding to the surface 7 except with respect to the portion where the threaded bore is provided. In the inside of the damper body 1, a hole 10 for controlling the vibration absorbing ability is formed which matches with the threaded bore and is opened outwardly at a surface 11 opposing the surface 7.

A groove 12 is formed on the damper body 1 along the side where the surfaces 4 and 7 come into contact with each other in order to further heighten vibration absorbing ability. On two side surfaces extending orthogonally with respect to the surfaces 4 and 7 (one of them is represented as 13 in FIG. 1), grooves 14 are formed such as to extend diagonally from each end of the groove 12 to the center of each of said side surfaces, and further, grooves 16 and 17 are such as to extend from the inner end of each groove 14 in orthogonal relation to the surfaces 11 and 15, respectively. On each of the saurfaces 11 and 15 are formed a groove 18 extending to the outer end of the groove 16 on each of the above-described side surfaces and a groove 19 extending to the outer end of the groove 17.

A vibration damper according to the invention having the above-described structure is attached to a frame body of a tool by a bolt engaging the nut 8, and is secured by screwing the threaded portion 5 of the bolt 2 into the threaded bore of the main body of an internal combustion engine. The vibration damper according to the invention effectively absorbs vibration by converting vibration generating force generated by the internal combustion engine or the like into shearing stress in correspondence with its direction and minimizes the transference of the vibration to the frame body of the tool.

It is possible in the embodiment to replace the bolt 2 by a nut or other appropriate fixture, and the nut 8 by a bolt or other appropriate fixture.

While there has been described what is at present considered to be a preferred embodiment of the invention, it will be understood that various modifications may be made therein, and it is intended that the appended claims cover all such modifications as fall within the true spirit and scope of the invention.

What is claimed is:

1. A vibration damper comprising:
   a main body which is formed from an elastic material into a substantially cubic overall form having a plurality of grooves, which grooves are connected with each other on one surface of the main body;
   fixtures which are attached to each of a first two surfaces of said main body which first two surfaces are adjacent each other;
   a first groove formed on the body along the side where the first two surfaces bearing fixtures come together;
   second two surfaces extending orthogonally with respect to said first two surfaces, said second two surfaces bearing a second groove and a third groove respectively, which second groove and said third groove are formed so as to extend diagonally from a respective end of said first groove to the center of their respective said second two surfaces and terminating at said center to form inner ends;

fourth and fifth grooves extending from the inner end of said second and third grooves in each said second two surfaces in orthogonal relationship to said first two surfaces, respectively and terminating in outer ends;

sixth and seventh grooves formed on a respective one of third two surfaces, said third two surfaces, located opposite said second two surfaces, and said sixth groove extending to the outer end of said fourth groove on each of said second two surfaces, and said seventh groove extending to the outer end of said fifth groove.

* * * * *